United States Patent [19]

Moon

[11] Patent Number: 5,154,895
[45] Date of Patent: Oct. 13, 1992

[54] OZONE GENERATOR IN LIQUIDS

[75] Inventor: Jae-Duk Moon, #101-502 Garden Heights, 300 Bumeo-dong, Suseong-ku, Taegu, Rep. of Korea

[73] Assignees: SamSung Electronics Co., Ltd., Suweon; Jae-Duk Moon, Taegu, both of Rep. of Korea

[21] Appl. No.: 661,203

[22] Filed: Feb. 27, 1991

[30] Foreign Application Priority Data

Mar. 3, 1990 [KR] Rep. of Korea ............... 1990-2787

[51] Int. Cl.$^5$ .................. B01J 19/08; B01J 19/12
[52] U.S. Cl. .................. 422/186.07; 422/186.16
[58] Field of Search ............. 422/186.07, 186.15, 422/186.21, 186.16

[56] References Cited

U.S. PATENT DOCUMENTS

| | | | |
|---|---|---|---|
| 614,500 | 11/1898 | Ramage | 422/186.07 |
| 1,180,372 | 4/1916 | Breydel | 422/186.02 |
| 2,080,929 | 5/1937 | Rose | 204/171 |
| 2,822,327 | 2/1958 | Hammesfahr | 204/176 |
| 3,623,970 | 11/1971 | Haas | 204/314 |
| 3,899,682 | 8/1975 | Lowther | 250/532 |
| 4,131,526 | 12/1978 | Moeglich | 204/149 |
| 4,316,782 | 2/1982 | Foller et al. | 204/129 |
| 4,375,395 | 3/1983 | Foller et al. | 204/129 |
| 4,790,980 | 12/1988 | Erni et al. | 422/186.15 |
| 4,869,881 | 9/1989 | Collins | 422/186.18 |
| 4,978,438 | 12/1990 | Shimamune et al. | 204/265 |
| 4,983,265 | 1/1991 | Maruyama | 204/269 |

Primary Examiner—Brooks H. Hunt
Assistant Examiner—Daniel J. Jenkins
Attorney, Agent, or Firm—Robert E. Bushnell

[57] ABSTRACT

This invention discloses an ozone generator having a simple structure and little mechanical trouble, whereby ozone gas is generated directly in water or stagnant solutions having a high electric conductivity without any blower or bubble generating device, including one or more pairs of electrodes being submerged in liquids, the electrodes being made with metals resistant to oxidation such as platinum, the shape of said electrodes being formed in a strip line type and on an insulator substrate, the spacing between said electrodes being set to be of 0.02 to 1 mm, a square wave voltage with positive and negative pulses are supplied to said electrodes, thereby build-up of impurity in liquids to said electrodes being prevented, thus high concentration of ozone $O_3$ generated effectively by combining O with $O_2$ produced through dissociation of water molecule in liquids without the danger of ozone gas leakage in the air, thus favorably applicable for the manufacturing process of foods and pharmaceutical chemicals, storage of agricultural products, sterilization and disinfection.

10 Claims, 1 Drawing Sheet

OZONE GENERATOR IN LIQUIDS

BACKGROUND OF THE INVENTION

1. Field of the Invention

The present invention relates to an ozone generator in liquids. More particularly, the present invention relates to an apparatus for generating ozone by supplying a voltage to the electrodes fixed opposite to each other and submerged in liquids.

2. Description of the Prior Arts

Ozone has been being used in various fields of application for compact type of account of its prominent effects of sterilization, disinfection, bleaching and deodorization.

There is a growing demand, in recent years, on multi-purpose ozone generators. A compact type of ozone generator, one that utilizes an ultra-violet ray, was used in the past, but in recent days a compact ceramic type utilizing surface discharge developed in Japan is being used.

In order to treat water with a conventional ozone generator, carrier air is supplied into the ozone generator by a blower, and then the carrier air containing ozone is diffused into the water by exploitation of a bubble-generating device, and thereby ozone-containing bubbles contact water and thus dissolves in water. Hence, it is essential to provide a blower and a bubble-generating device. Consequently, it requires considerable expenditure, and also problems are posed; stopping up the holes, lowering of the efficiency, making noises, etc. Furthermore, if these conventional apparatuses are used for a humidifier or a washing machine to kill the bacteria, severe problems will be met with leakage of ozone from the carrier air to affect the human respiratory organs.

SUMMARY OF THE INVENTION

It is an object of the present invention to provide an apparatus that generates, directly, ozone gas in water without any use of blower or bubble-generating device so as to solve those problems as mentioned above.

It is another object of the present invention to provide an apparatus for producing more ozone gas with its small and simple structure.

It is a further object of the present invention to provide an ozone generator with a lower rate of possible mechanical troubles.

The present invention generates ozone in liquids or solutions by submerging at least one pair of electrodes, placed opposite to each other in liquids (water or other solutions such as $H_2SO_4$, $HClO_4$, $HBF_4$, $H_3PO_4$, etc.), which are connected to an electric power source, and combining O and $O_2$ gas generated by dissociation of the water molecules to produce molecular size ozone gas in the form of bubbles and being dissolved and held in the liquid. In this manner, we can use directly or indirectly the solution, wherein ozone gas is dissolved and held, or we can use the ozone gas by separating it from the liquid into the carrier air for sterilization, disinfection or bleaching, etc.

When the apparatus of the present invention is fixed in water, molecular size ozone gas bubbles entirely dissolved are produced and held in water. Therefore, the apparatus of the present invention has such merits that there is no need of any auxiliary devices such as a blower or a diffuser, and there is no leakage of ozone gas from the carrier gas.

BRIEF DESCRIPTION OF THE DRAWINGS

The present invention will now be described in further detail as the form of the preferred embodiments with reference to the accompanying drawings, wherein.

DETAILED DESCRIPTION OF THE PREFERRED EMBODIMENTS

Embodiment 1

Figure 1:
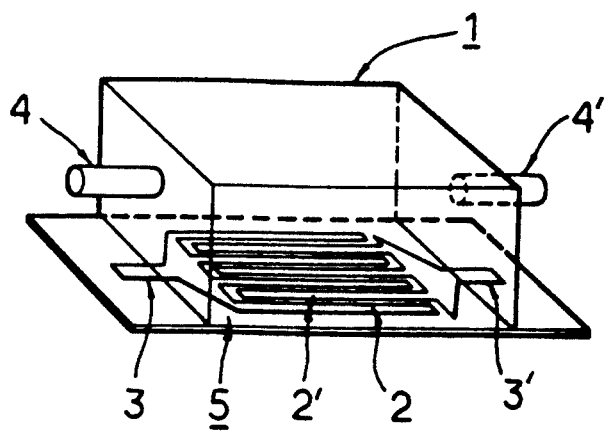
FIG. 1 illustrates an embodiment of the present invention.

FIG. 1 illustrates an example of the present invention wherein three pairs of strip line type electrodes 2, 2' with outer terminals 3, 3' are fixed on the substrate 5 in such a manner that each pair of electrodes 2, 2' is placed opposite to each other with a spacing of 1 mm and the electrodes 2, 2' are placed in a container 1, where an inlet and an outlet 4, 4' enabling the water to flow into and out of the container are provided. When electric current is supplied to the electrodes 2, 2' from a pulse voltage source through the outer terminals 3, 3' connected to one side of said oppositely fixed electrodes 2, 2', the water molecule is dissociated from the electrodes 2, 2' to produce ozone gas in water. Though it is possible to make only one pair of electrodes placed opposite to each other according to the required quantity of ozone gas, it is of course possible to have two or more pairs of electrodes.

Recent experiments have shown that metals such as Pt., $PbO_2$ and $SnO_2$, which are resistant to oxidation, are good for a material of the electrodes.

It is possible to vary the spacing between the electrodes within the range of 0.01 to 2 mm according to the size of the electrodes and the pulse voltage. The quantity of generated ozone gas may be increased by means of making longer the length of the electrodes 2, 2' from which ozone gas is produced, or increasing the electric current supply.

It is possible to make the electrodes 2, 2' in a wire shape, but the wire electrodes are liable to be cut off due to their short-circuiting when the wire electrodes become longer to meet the required ozone quantity.

However, if the electrodes are formed in the strip line type by means of printing, plating or fabricating techniques used in semi-conductor devices (e.g. vacuum deposition, CVD, screen printing, etching, etc.) on the insulator substrate, it is possible to save the expensive electrode materials, to enjoy merits of mass production, and to avoid wire cutting problems. Further, it is possible to set additional electrodes on the upper or lower side of the container, differently from that of FIG. 1.

Embodiment 2

Figure 2A:
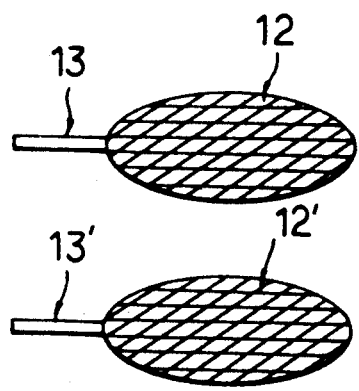
FIG. 2a illustrates two oppositely placed electrodes with porous insulator substrates.
Figure 2B:
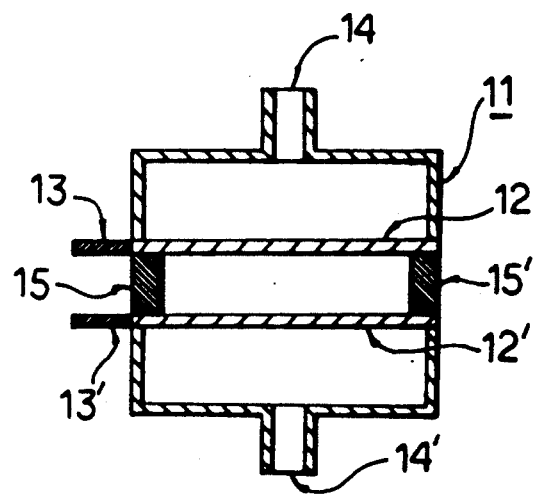
FIG. 2b illustrates two oppositely placed electrodes within a preferred embodiment of the present invention.
Figure 3:
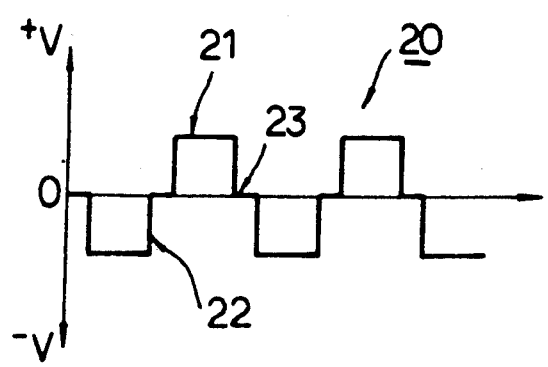
FIG. 3 shows a diagram of a square wave voltage to be supplied to the electrodes of the apparatus of the present invention.

FIG. 2 illustrates another embodiment of the present invention showing an ozone generator in water, wherein two oppositely placed electrodes of porous insulator substrates 12, 12' are provided and connected to the outer terminals 13, 13', the electrodes being placed in a container 11 with an inlet and an outlet 14, 14' of water and being opposite to each other using insulators 15, 15' therebetween.

Experiments of the ozone generator in water as mentioned above have shown that the problems due to the short circuit of electrodes have been eliminated, although the efficiency of ozone generation has somewhat been decreased. It is of course possible to make the electrodes of porous substrate 12, 12' of mesh type.

The Korean Patent Appln. No. 87-15779 (A process for generating ozone in water and apparatus therefor) and Appln No. 88-9916 (A process for making ozone water and apparatus therefor) of the present inventor also disclose electrodes fixed opposite to each other, but the shape of electrodes is formed in a wire type, needle type or disk type. In such types of structures, the length of the wire electrode is required to be long and short circuits are caused frequently while being in use, if the apparatus becomes larger in size in order to meet the quantity of the required ozone. As for the electrodes of needle type, there is a problem of abrasion in the needle tip in the process of manufacture as well as in the process of ozone generation. Regarding the disk type of electrodes, when the spacing between the electrodes is set extremely close to each other to meet required ozone quantity, there is a difficulty for ozone generating and separating, and heat sinking between the electrodes. Hence, it has a demerit of low efficiency in the ozone generation and thereby, is not applicable to the apparatus of the present invention.

Thus, the inventor of the present invention has carried out experiments, using various shapes of electrodes and finally reached a solution of the above stated problems by making the electrode in the strip line shape formed on the insulator substrate. That is to say, by making use of various techniques such as printing, plating, semi-conductor manufacturing, etc., it has become possible to make uniform inter-electrode spacing and keep it extremely close to each other of the electrodes, up to the degree of 0.01 to 1 mm. Accordingly, the electric voltage to be supplied between the electrodes could greatly be reduced, and the electric power being consumed as the heat between the electrodes has been reduced to the minimum. Consequently, the efficiency of ozone generation has been enhanced greatly in comparison with such electrodes of the plate shape, and also the efficiency of ozone generation becomes greatly increased due to the formation of a large, but not uniform electric field between the end surfaces of each strip line type electrodes fixed opposite to each other. Furthermore, the problems of abrasion or short-circuit trouble are eliminated in comparison with the electrodes of the wire type or needle type. Thus, the reliability and stability of the apparatus are greatly improved and a great deal of reduction (about one tenth) in the quantity of the materials (e.g. Pt., etc.) leads eventually to lower manufacturing costs.

However, in the case of micro size ozone generator, there will not be any great problems, even if the electrodes are formed according to the shapes as disclosed in the afore-mentioned Korean Patent Appln. Nos. 87-15779 and 88-9916, when the required ozone is very small. It is also possible to fix the insulator substrate, on which the strip line shaped electrodes are formed, on the upper or lower side of the container or in the central part thereof.

In particular, in case of forming the strip line shaped electrodes on both sides of the insulator substrate, the location thereof is free from any restriction. The substrate 5 on which the electrodes 2, 2' are formed opposite to each other may be changed to various kinds of shapes, e.g. a cylindrical type, a tetrahedral type, a pipeline type, etc. according to the needs thereof in addition to the plate type as described in the above. It is also possible to combine multiple numbers of substrate 5 in series or in parallel for use in accordance with the usage and variation of ozone quantity needed. It is also possible to make holes directly on the substrate 5 and use it by allowing water to flow through the electrode plates.

The present invention is an improvement of the power supply for the apparatus disclosed in the aforestated Korean Patent Appln. Nos. 87-15779 and 88-9916. That is to say, in the cases of the inventions as above, they have some disadvantages resulting from the direct current voltage supply, such as build-up of impure particles in water on the electrodes, when the apparatus is used for a long time and thereby a great deal of reduction of the electric current and the quantity of ozone production are brought about, making the apparatus useless after all. Such demerits have been eliminated in the present invention by means of supplying to the electrodes 2, 2' or 12, 12' a square wave pulse voltage 20 with alternating positive and negative pulses 21, 21', and thereby the impurity build-up problems have completely been cleaned up.

Furthermore, by means of varying the frequency of alternating pulse voltage, it is possible to increase the quantity of generated ozone at maximum one and a half as much as that produced when the direct current voltage is supplied. In such cases, it is possible to let the alternating square wave pulse voltage 20 have a pausing time 23 and if this pausing time 23 is chosen adequately (0.1 to 1000 mS), it may serve to protect the semi-conductor elements within the power source circuit. However, there will be some cases where the pausing time 23 may not be necessary for the micro size ozone generator requiring a little current.

In cases where the ozone generator of the present invention is fixed in an upper-opened tub containing stagnant solution (e.g. $H_2SO_4$, $HClO_4$, $HBF_4$, $H_3PO_4$, etc.) of a high electric conductivity, in place of water having low electric conductivity, and an electric source voltage (direct or pulse current) is supplied thereto, a large amount of electric current flows in the solution. Then, a great quantity of ozone is generated in proportion to said current and the solution becomes saturated with ozone and ozone bubbles are separated into the air from the solution tub. If carrier air (e.g. nitrogen, etc.) is introduced to the upper side of the solution tub, the carrier air comes to include ozone and the concentration of ozone can be controlled by varying the flow rate of the carrier air.

Although the above-stated way of generating ozone is entirely different from the conventional ozone gas generators with regard to the mechanism of ozone generation, it can be applied to the similar usage as the small size ozone generators.

Further, the present invention has such advantages that a higher concentration (10%) of ozone can be achieved in comparison with the that (2%) of the conventional apparatus, and an enhancement of the efficiency can be expected. Thus, the apparatus of the present invention can be used as an apparatus of ozone gas generation in the air as has been used by the conventional one. Furthermore, the apparatus of the present invention requires less expenses in order to obtain the same amount of dissolved ozone gas held in water, since there is no need of using a blower and/or a diffuser.

The apparatus is low in the mechanical trouble rate and also there is no leakage of ozone into the living space of human beings or animals. Since the apparatus of the present invention has a high production efficiency, a long life expectancy, and a good reliability, it can be used adequately and effectively in various application fields including biohazard controlling of the manufacturing process of foods and pharmaceutical chemicals, treatment of water supply and minor sewage disposal, sterilization and storage of foods and agricultural products, disinfection at general residences and business entities related with the public hygiene (e.g. restaurants, hotels, hospitals, public bathhouses, etc.).

What is claimed is:

1. An ozone generator in liquids, comprising:
   one or more pairs of stripline electrodes formed on insulator substrates positioned within water and solutions, and
   means for supplying to said electrodes, an alternating square wave pulse voltage for generating a large electric field between surfaces of each electrode of said pair of electrodes,
   said electrodes of said pair of electrodes being oppositely positioned within the water or solutions, for dissociating molecules of the water or solutions to produce ozone gas.

2. The ozone generator of claim 1, wherein the square wave pulse voltage has pause times.

3. The ozone generator of claim 1, wherein both sides of the electrodes are formed in a disk mesh shape.

4. The ozone generator of claim 1, wherein the inter-electrode spacing between the electrodes is in the range of 0.01 to 2 mm.

5. The ozone generator of claim 3, wherein the inter-electrode spacing between the electrodes is in the range of 0.01 to 2 mm.

6. An ozone generator, comprising:
   means for providing an electrically insulating substrate;
   a plurality of spaced-apart stripline electrodes formed on said insulating substrate means;
   a container for channeling liquids across said plurality of electrodes; and
   means for sequentially applying across said electrodes pulses of positive and negative potentials for generating a large electric field between surfaces of each of said electrodes;
   said large electric field dissociating molecules of said liquids for producing ozone gas.

7. The ozone generator of claim 6, further comprised of an insulator serving as a substrate for said strip lines.

8. The ozone generator of claim 6, wherein said electrodes comprise:
   a plurality of porous substrates; and
   electrically conducting material disposed on said porous substrates.

9. The ozone generator of claim 6, further comprised of inter-electrode spacing between said plurality of electrodes being within the range of 0.01 to 2.0 millimeters.

10. The ozone generator of claim 7, further comprised of:
    a plurality of porous substrates; and
    electrically conducting material disposed on said porous substrates.

* * * * *